United States Patent
Ohtsubo

(10) Patent No.: US 8,624,990 B2
(45) Date of Patent: Jan. 7, 2014

(54) SIGNAL PROCESSING DEVICE, CAMERA MODULE, MOBILE TERMINAL DEVICE AND IMAGING METHOD

(75) Inventor: Shinichi Ohtsubo, Kanagawa (JP)

(73) Assignee: Sony Corporation (JP)

( * ) Notice: Subject to any disclaimer, the term of this patent is extended or adjusted under 35 U.S.C. 154(b) by 484 days.

(21) Appl. No.: 12/589,971

(22) Filed: Oct. 30, 2009

(65) Prior Publication Data

US 2010/0128143 A1    May 27, 2010

(30) Foreign Application Priority Data

Nov. 27, 2008   (JP) ................................ P2008-302831

(51) Int. Cl.
*H04N 5/228*    (2006.01)

(52) U.S. Cl.
USPC .................................. 348/222.1; 348/207.99

(58) Field of Classification Search
USPC ......................................... 348/222.1, 207.99
See application file for complete search history.

(56) References Cited

U.S. PATENT DOCUMENTS

| | | | |
|---|---|---|---|
| 4,878,119 A * | 10/1989 | Beikirch et al. | ............... 358/471 |
| 2006/0285004 A1 * | 12/2006 | Suemoto | ...................... 348/340 |
| 2007/0291132 A1 * | 12/2007 | Shigeta et al. | ............. 348/222.1 |
| 2008/0111910 A1 * | 5/2008 | Nikkanen et al. | ............. 348/345 |
| 2009/0251584 A1 | 10/2009 | Alakarhu | |

FOREIGN PATENT DOCUMENTS

| | | |
|---|---|---|
| JP | 2005260733 A | 9/2005 |
| JP | 2007-133028 A | 5/2007 |
| JP | 2009-518913 T | 5/2009 |
| WO | 2007065964 A1 | 6/2007 |

OTHER PUBLICATIONS

Office Action from Japanese Application No. 2008-302831, dated Sep. 14. 2010.

* cited by examiner

*Primary Examiner* — James Hannett
*Assistant Examiner* — Angel L Garces-Rivera
(74) *Attorney, Agent, or Firm* — Lerner, David, Littenberg, Krumholz & Mentlik, LLP

(57) ABSTRACT

A signal processing device is provided which includes, an input terminal to receive input of an imaging start instruction signal, and a signal processing unit to output an exposure start instruction signal when the imaging start instruction signal is input to the input terminal.

8 Claims, 12 Drawing Sheets

FIG.5

| PRESSED STATE | STATE OF RELEASE BUTTON | DEFINITION OF TIME LAG |
|---|---|---|
| ALL-PRESS | ↑ | SHOOTING TIME LAG (NOT INCLUDING AF LAG) |
| HALF-PRESS → FULL-PRESS | ↑ | SHUTTER RELEASE LAG |

SIGNAL PROCESSING DEVICE, CAMERA MODULE, MOBILE TERMINAL DEVICE AND IMAGING METHOD

CROSS-REFERENCE TO RELATED APPLICATION

The present application claims priority from Japanese Patent Application No. JP 2008-302831 filed in the Japanese Patent Office on Nov. 27, 2008, the entire content of which is incorporated herein by reference.

BACKGROUND OF THE INVENTION

1. Field of the Invention

The present invention relates to a signal processing device, a camera module, a mobile terminal device and an imaging method.

2. Description of the Related Art

Mobile terminal devices become increasingly multifunctional today, and a camera module that implements an advanced digital camera function is incorporated into many mobile terminal devices. For example, a mobile phone that incorporates such a camera module can perform imaging with advanced digital processing such as autofocus and image stabilization, in addition to basic communication such as phone calls and email, in a single mobile phone terminal.

In such a multifunctional mobile terminal device, various functional modules are incorporated into a single housing. The respective functional modules are controlled with use of a command prepared for each module, and a user interface or an internal bus for issuing such a command is often shared among modules because of constraints on device size. For example, Japanese Unexamined Patent Application Publication No. 2007-133028 discloses a camera-equipped mobile phone on which a plurality of shared buttons that are used as an operating unit for operating a camera module in a camera mode are mounted.

SUMMARY OF THE INVENTION

However, in a release operation of a camera shutter, for example, instant reaction is required from an operation by a user to actuation of a functional module. From this point of view, if a user interface or an internal bus is shared among a plurality of modules, an overhead necessary for interpretation or transmission of a signal increases, which causes an increase in a time lag between an operation by a user and actuation of a functional module. Specifically, in the case where a camera module is incorporated into a mobile terminal device, for example, it is likely to miss a photo opportunity due to a time lag between pressing of a release button and start of exposure.

In light of the foregoing, it is desirable to provide a novel and improved signal processing device, camera module, mobile terminal device and imaging method that enable reduction of a time lag between a release operation and start of exposure.

According to an embodiment of the present invention, there is provided a signal processing device including, an input terminal to receive input of an imaging start instruction signal, and a signal processing unit to output an exposure start instruction signal when the imaging start instruction signal is input to the input terminal.

The signal processing unit may detect input of the imaging start instruction signal to the input terminal with use of an external interrupt.

The signal processing unit may output the exposure start instruction signal as an asynchronous signal without synchronization with a cyclic signal.

The signal processing unit may forcibly switch vertical synchronization timing of its own device in accordance with output of the exposure start instruction signal.

The signal processing unit may further output an exposure start notification signal for notifying start of exposure to an external device when the imaging start instruction signal is input to the input terminal.

According to another embodiment of the present invention, there is provided a camera module including, an input terminal to receive input of an imaging start instruction signal, a signal processing unit to output an exposure start instruction signal when the imaging start instruction signal is input to the input terminal, and an image sensor unit to image external light and generate an image signal when the exposure start instruction signal is input.

According to another embodiment of the present invention, there is provided a camera-equipped mobile terminal device including, a release button to generate an imaging start instruction signal when pressed by a user, an input terminal to receive input of the imaging start instruction signal generated by the release button, a signal processing unit to output an exposure start instruction signal when the imaging start instruction signal is input to the input terminal, and an image sensor unit to image external light and generate an image signal when the exposure start instruction signal is input.

According to another embodiment of the present invention, there is provided an imaging method comprising the steps of, transmitting an imaging start instruction signal from a release button pressed by a user to an input terminal of a camera module without through a host control unit, detecting the imaging start instruction signal input to the input terminal by a signal processing unit of the camera module, transmitting an exposure start instruction signal from the signal processing unit to an image sensor, and imaging external light and generating an image signal by the image sensor where the exposure start instruction signal is input.

According to the embodiments of the present invention described above, it is possible to provide the signal processing device, camera module, mobile terminal device and imaging method that enable reduction of a time lag between a release operation and start of exposure.

BRIEF DESCRIPTION OF THE DRAWINGS

FIG. 5 is an explanatory view showing definition of two kinds of a time lag related to a release operation.

DETAILED DESCRIPTION OF EMBODIMENT

Figure 1:
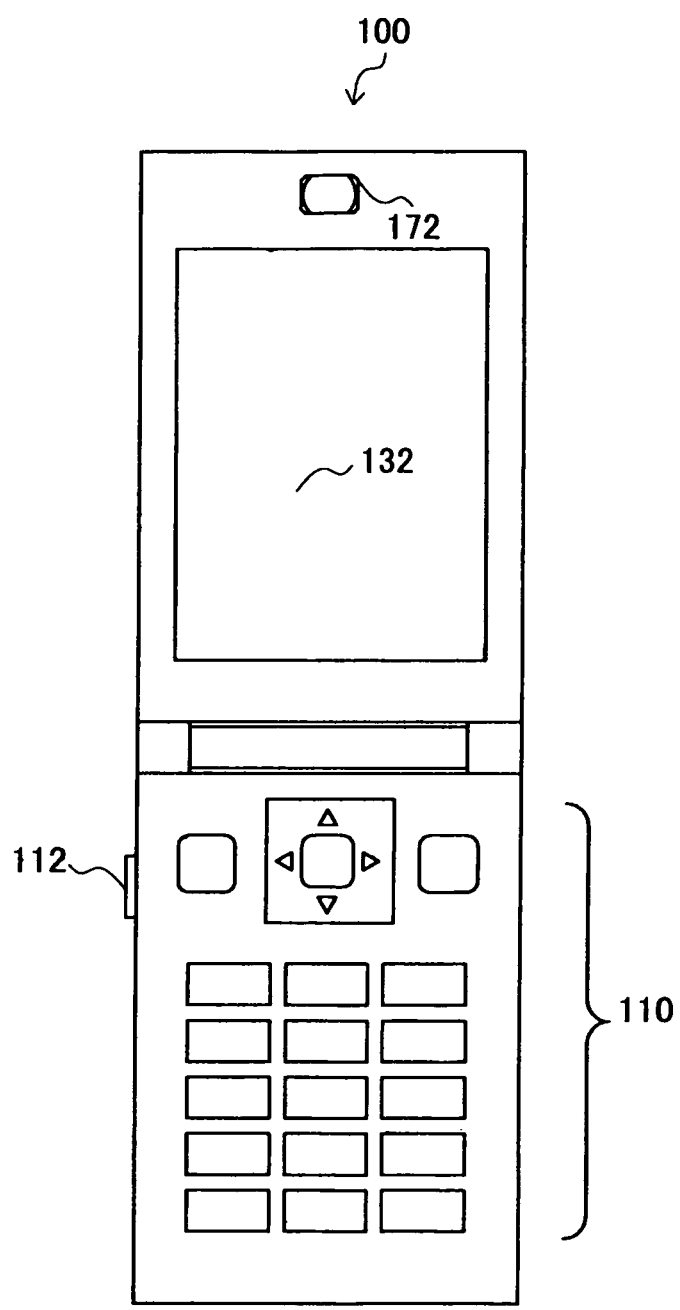
FIG. 1 is a schematic view showing an appearance of a camera-equipped mobile terminal device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

1. Outline of Device
2. Explanation of Issues Related to the Present Invention
3. Explanation of Embodiment of the Present Invention
4. Summary <1. Outline of Device>

An outline of a camera-equipped mobile terminal device is described hereinafter with reference to FIGS. 1 and 2.

FIG. 1 is a schematic view showing an appearance of a camera-equipped mobile terminal device 100 (which is referred to hereinafter simply as the mobile terminal device 100) according to an embodiment of the present invention. Referring to FIG. 1, a keypad 110, a dedicated button 112, a display unit 132, a lens 172 and so on appear on the outside of the mobile terminal device 100.

The display unit 132 is an image display means that is made of a liquid crystal, OLED (Organic Light Emitting Diode) or the like, and the display unit 132 displays given still images or moving images for a user.

The keypad 110 includes a plurality of buttons that are used in common by various functional modules incorporated in the mobile terminal device 100. If a user presses any button of the keypad 110, a signal for identifying the kind of the pressed button is transmitted to a control unit (not shown; which is referred to hereinafter as a host control unit), such as a CPU (Central Processing Unit), inside the mobile terminal device 100.

The dedicated button 112 is a button that is used exclusively by a particular functional module, such as a camera module 140 which is described later with reference to FIG. 2, incorporated in the mobile terminal device 100.

The lens 172 is a lens that is mounted on the camera module 140 incorporated in the mobile terminal device 100. The camera module 140, which is described later with reference to FIG. 2, images external light through the lens 172.

The layout of the parts on the outside of the mobile terminal device 100 is not limited to such an example. Further, although FIG. 1 shows a mobile phone as an example of the mobile terminal device 100, the mobile terminal device 100 is not limited to a mobile phone. For example, the mobile terminal device 100 may be an arbitrary terminal device such as a PC (Personal Computer), a PDA (Personal Digital Assistants) or a mobile game terminal.

Figure 2:
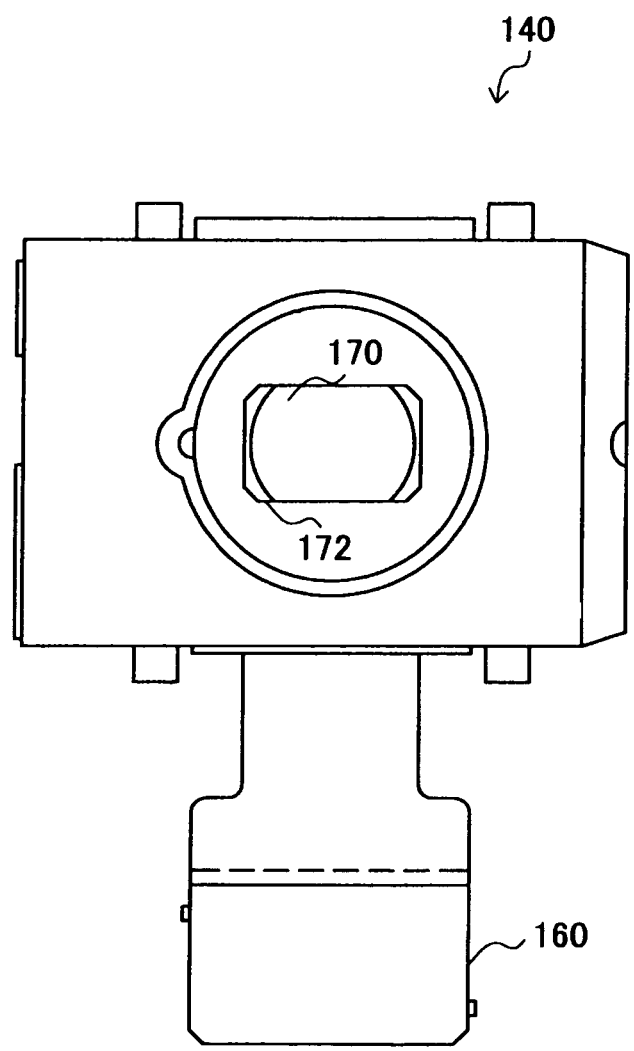
FIG. 2 is a schematic view showing an appearance of a camera module according to an embodiment.

FIG. 2 is a schematic view showing an appearance of the camera module 140 incorporated in the mobile terminal device 100. Referring to FIG. 2, a terminal unit 160, an image sensor unit 170 and a lens 172 appear on the outside of the camera module 140.

The terminal unit 160 includes at least one input terminal for inputting a signal from the host control unit to the camera module 140 and at least one output terminal for outputting a signal from the camera module 140 to the host control unit. Further, the terminal unit 160 includes an input terminal that directly receives a signal input from an external button without through another control unit, which is a feature of the present invention. The signal that is input to the camera module 140 through the terminal unit 160 is processed by a signal processing unit (not shown), which is described later, incorporated in the camera module 140. An example of allocation of input and output terminals in the terminal unit 160 is described in detail later.

The image sensor unit 170 is placed on the inner side of the lens 172, and it images external light that reaches a light-receiving surface through the lens 172 and generates an image signal. The image sensor unit 170 may be an image sensor using a CCD (Charge Coupled Device Image Sensor), a CMOS (Complementary Metal Oxide Semiconductor) or the like.

The lens 172 is a part that appears on the outside of the device when the camera module 140 is mounted on the mobile terminal device 100, for example, as shown in FIG. 1. As described above, the camera module 140 images external light through the lens 172.

<2. Explanation of Issues Related to the Present Invention>

In order to clarify an issue related to the present invention, a signal transmission channel inside a general camera-equipped mobile terminal device related to the present invention is described hereinafter.

Figure 3:
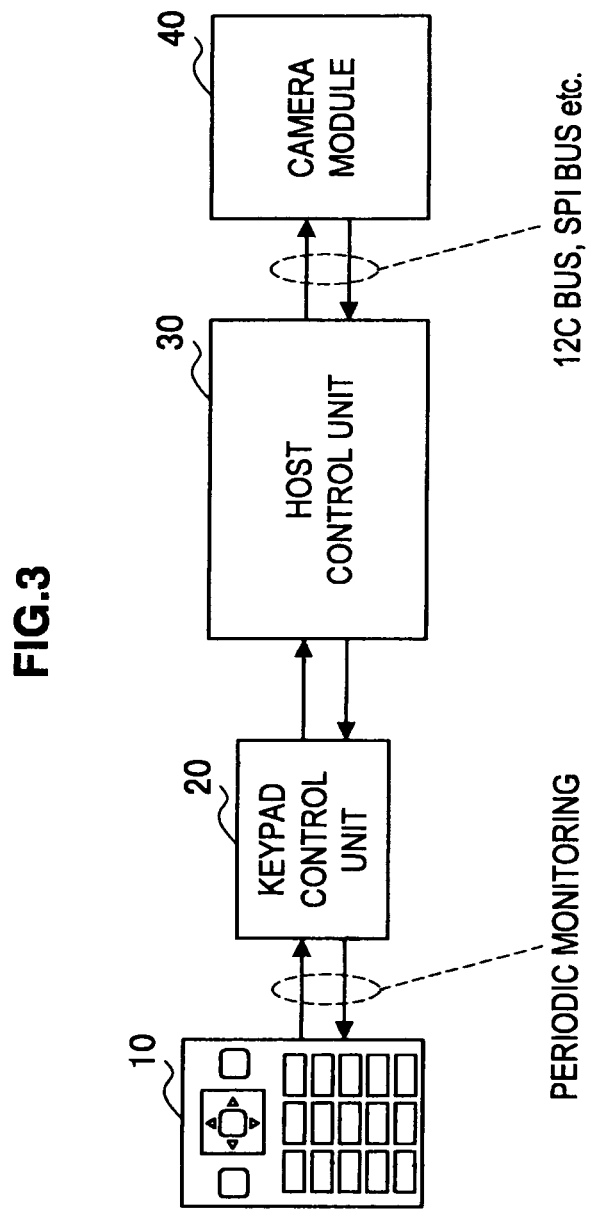
FIG. 3 is an explanatory view showing an example of a signal transmission channel in a general camera-equipped mobile terminal device.

FIG. 3 is an explanatory view showing a signal transmission channel through which a signal is transmitted to a camera module via a host control unit after a button is pressed in a general camera-equipped mobile terminal device.

Referring to FIG. 3, a keypad 10, a keypad control unit 20, a host control unit 30 and a camera module 40, which are included in a general camera-equipped mobile terminal device, are shown.

The keypad 10 includes a plurality of buttons to be pressed by a user. The plurality of buttons of the keypad 10 form a key matrix, for example, and they are periodically scanned along each line of the key matrix by the keypad control unit 20. The keypad control unit 20 determines which button of the keypad 10 is pressed by such periodic monitoring of the key matrix and outputs an input signal associated with the kind of the pressed button to the host control unit 30.

The host control unit 30 recognizes the input signal from the keypad control unit 20, interprets the meaning of the input signal and generates a signal to be output to the camera module 40. The host control unit 30 and the camera module 40 are connected by an I2C (Inter-Integrated Circuit) bus, an SPI (Serial Peripheral Interface) bus or the like, for example.

The I2C bus is one of standard specifications of a bus for connecting a CPU with a peripheral device by two signal lines. The I2C bus is widespread as a bus to be used for a mobile terminal device for its merits of allowing device weight and power consumption reduction, production cost reduction or the like, for example.

Figure 4:
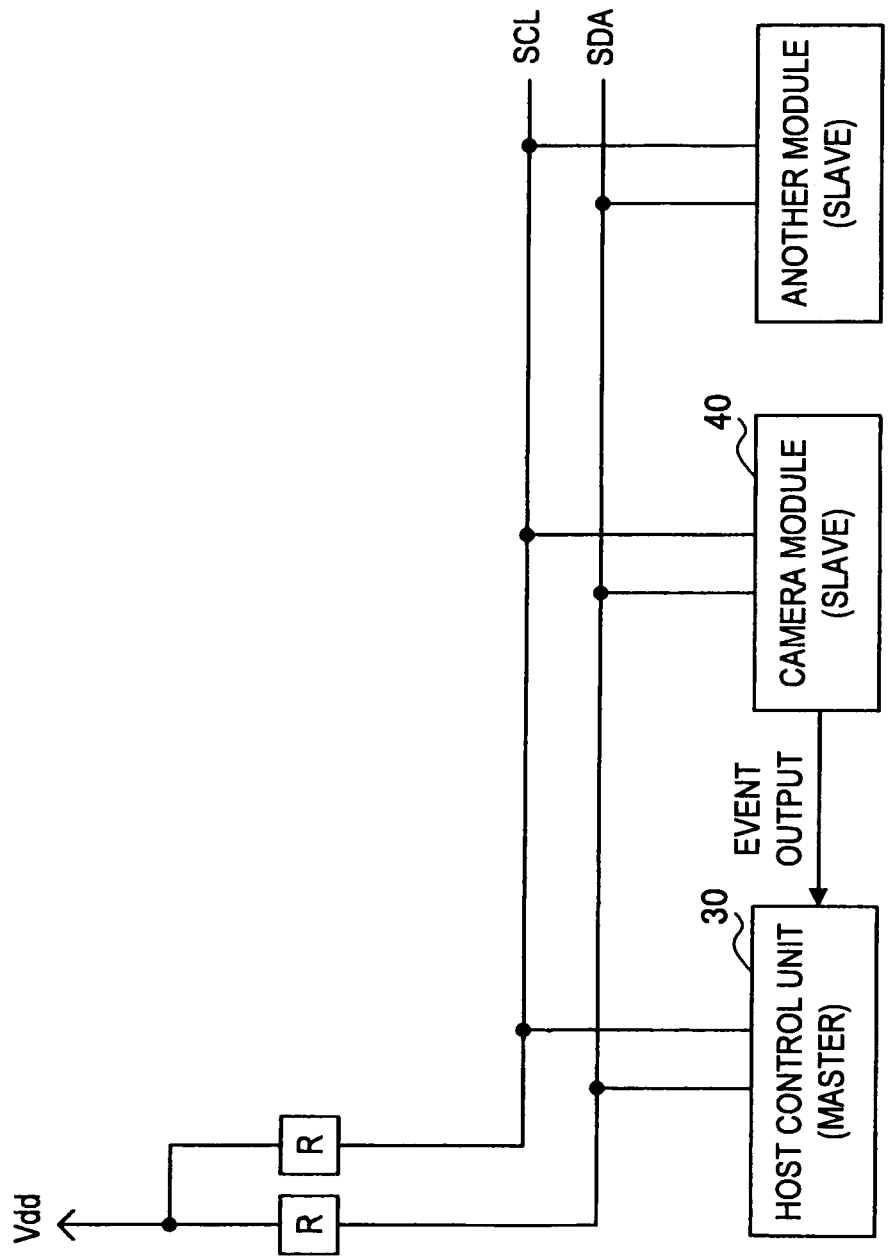
FIG. 4 is an explanatory view showing a connection pattern between a host control unit and a camera module through an I2C bus.

FIG. 4 is an explanatory view showing a more specific connection pattern in the case of connecting the host control unit 30 and the camera module 40 with use of the I2C bus. Referring to FIG. 4, the I2C bus is composed of two lines:

SCL (Serial Clock Line) and SDA (Serial DAta line). The SCL is a line for transmitting a clock pulse. The SDA is a line for serially transmitting data.

In the connection pattern using the I2C bus shown in FIG. 4, the host control unit 30 serves as a master device on the I2C bus. Specifically, the host control unit 30 first generates a clock pulse and outputs it to the SCL. The host control unit 30 then transmits an address designating the camera module 40 as a slave to the SDA subsequent to a start state. Then, the camera module 40 recognizes that the received data contains the address designating itself and transmits a confirmation response signal by return. The host control unit 30 can thereby transmit and receive data to and from the camera module 40 until outputting a stop state.

Further, in addition to the I2C bus composed of SCL and SDA, a line for event output from the camera module 40 is placed in some cases between the host control unit 30 and the camera module 40. The line for event output is used to notify completion of processing executed by the camera module 40 to the host control unit 30, for example. The host control unit 30 can thereby read the event of the camera module 40 through the I2C bus.

The signal transmission channel of a general camera-equipped mobile terminal device is described in the foregoing with reference to FIGS. 3 and 4. The signal transmission channel, however, has various factors contributing to the occurrence of a time lag between a user's operation and start of the operation of the camera module 40.

A first factor is periodic monitoring on the respective buttons of the keypad 10. Because periodic monitoring by the keypad control unit 20 is generally performed at intervals of 10 to 20 ms, there is a possibility that a time lag of 20 ms at maximum is occurring after a user presses a button until the host control unit 30 recognizes pressing of the button. Further, in the case where a plurality of times of sampling is performed in order to prevent incorrect determination due to noise in the keypad 10, the time lag becomes wider by multiplication of the number of times of sampling.

A second factor is delay due to removal of chattering in the keypad 10. The chattering is a phenomenon in which on and off are repeated in a short time by vibration of a contact point due to manual switch, which causes malfunction of the device. Therefore, the chattering in the keypad 10 is removed by reading a port by adding a delay time of about 10 ms in the keypad control unit 20, for example.

A third factor is translation of a signal for the I2C bus by the host control unit 30. A signal that is transmitted or received through the I2C bus contains control information such as an I2C address, a packet length or an access code which is necessary for providing commonality of connection with various peripheral devices. Thus, a certain amount of time lag can occur while the host control unit 30 interprets an input signal and generates such control information. Further, a time lag can also occur after the host control unit 30 transmits a signal to the camera module 40 until the host control unit 30 frees the I2C bus for a wait for a phone call or the like, for example, after waiting for a response from the camera module 40.

A fourth possible factor is delay inside the camera module 40. Because exposure is generally started in accordance with a screen cyclic signal of a mobile terminal device in a camera module incorporated in a camera-equipped mobile terminal device, a time lag corresponding a cycle of a screen cyclic signal can occur.

A time lag related to a release operation of a camera is mainly classified into two kinds. FIG. 5 shows definition of a time lag in a guideline (CIPA DCG-002-2007-J) for specifications of a digital camera developed by CIPA (Camera and Imaging Products Association). According to the guideline, a time lag related to a release operation is classified into a shooting time lag and a shutter release lag. The shooting time lag indicates a period of time up until exposure start when a release button is pressed all the way down to the 2nd release from a standby state in the case where there is a distinction between the 1st release (half-press) and the 2nd release (full-press) for the pressed state of the release button. In the case where there is no distinction between the 1st release and the 2nd release for the pressed state of the release button, the shooting time lag indicates a period of time from pressing of the release button to start of exposure (a lag for autofocus is not included). On the other hand, the shutter release lag indicates a period of time after pressing of the 2nd release after stabilization of the 1st release up until start of exposure in the case where there is a distinction between the 1st release and the 2nd release for the pressed state of the release button.

The above-described four factors contributing to the occurrence of a time lag can affect both the shooting time lag and the shutter release lag shown in FIG. 5. Hereinafter, the term "time lag" includes both the shooting time lag and the shutter release lag unless otherwise noted.

Figure 6:
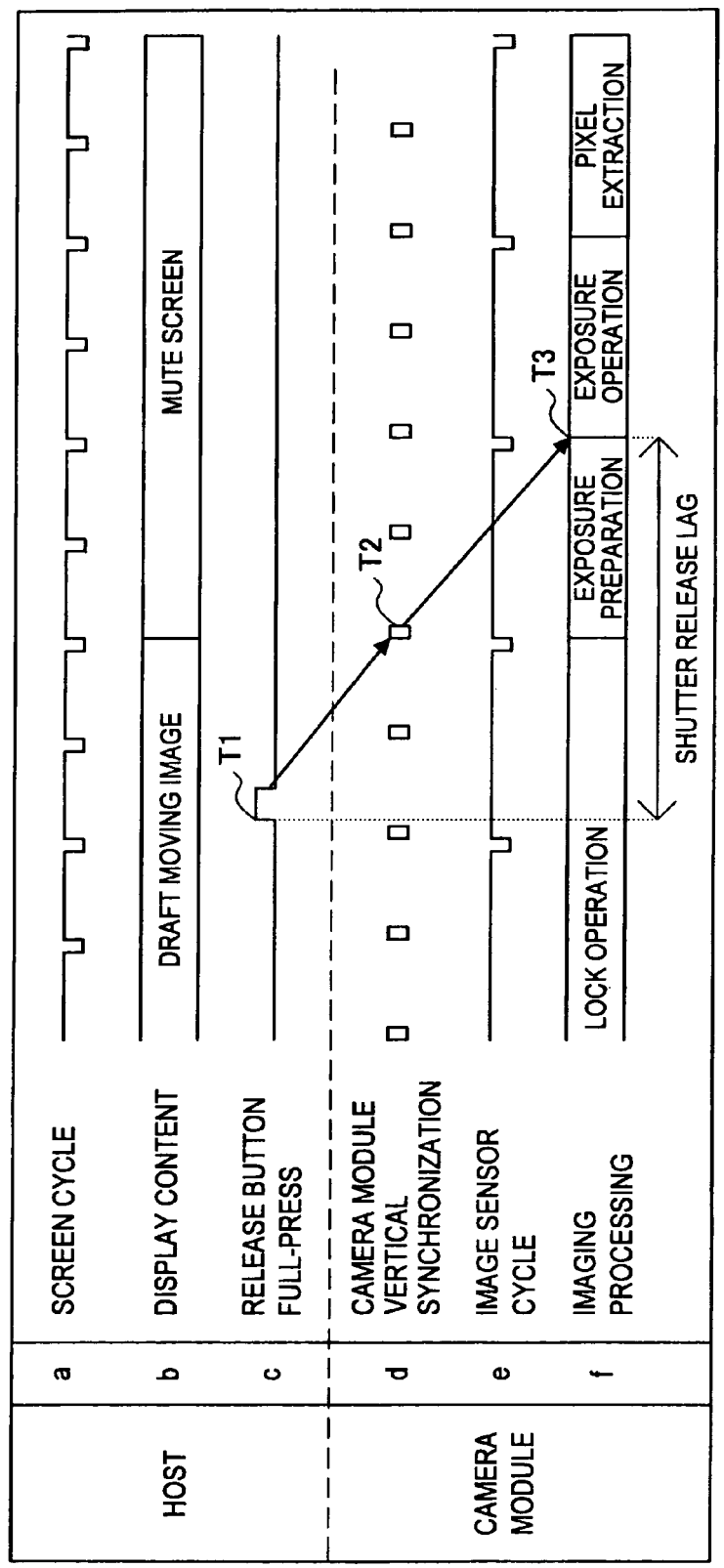
FIG. 6 is a timing chart showing a shutter release lag in a general camera-equipped mobile terminal device.

FIG. 6 is a timing chart to describe a shutter release lag in a general camera-equipped mobile terminal device as an example in further detail.

FIG. 6(a) indicates a screen cycle that is a cycle of updating a screen displayed on a display unit of a camera-equipped mobile terminal device. FIG. 6(b) indicates a state of a screen displayed on the display unit in accordance with the screen cycle of FIG. 6(a). FIG. 6(c) indicates a signal that is generated when the release button mounted on the camera-equipped mobile terminal device is pressed by a user.

On the other hand, FIG. 6(d) indicates a vertical synchronization signal for synchronizing the operations of the respective parts inside a camera module incorporated in the camera-equipped mobile terminal device. FIG. 6(e) indicates an operating cycle of an image sensor of the camera module. The operating cycle of the image sensor is twice the screen cycle of a host, for example, and synchronized with the screen cycle of the host. FIG. 6(f) indicates a state of imaging processing by the camera module.

At the left end of the timing chart of FIG. 6, the state of imaging processing by the camera module is in "LOCK operation" as a result that a user half-presses the release button. In this state, the camera module executes exposure control, autofocus, auto white balance or the like and then waits for a user's instruction for start of imaging. At this time, the screen of the host is in the state of "draft moving image" in which a rough image captured by the image sensor is displayed as it is.

After that, when a user full-presses the release button at timing T1, an imaging start instruction signal is generated by a host control unit and transmitted to the camera module through the I2C bus. Then, a signal processing unit of the camera module recognizes that the release button is fully pressed at the first vertical synchronization timing after transmission of the imaging start instruction signal and then outputs an exposure start instruction signal that instructs the image sensor to start exposure at the next vertical synchronization timing (T2). Receiving the exposure start instruction signal, the image sensor starts preparation for exposure ("exposure preparation") and then starts exposure at the next timing (T3) of the operating cycle of the image sensor ("exposure operation").

After the image sensor starts exposure preparation, the screen of the host is in the state of "mute screen" until a captured image signal is output. This is because an image signal output from the image sensor during this period is not a normal image. Therefore, the signal processing unit of the camera module switches the screen of the host to the mute screen by outputting an event to the host control unit, for example, before instructing the image sensor to start exposure.

As described above with reference to FIG. 6, the shutter release lag after a user full-presses the release button until the camera module starts exposure corresponds to the period from T1 to T3. During the shutter release lag, the period from T1 to T2, particularly, is substantially a period of waiting for start of imaging processing (start of exposure preparation). Therefore, if the above-described factors causing the time lag can be eliminated, the time lag between the release operation and the exposure start is reduced.

<3. Explanation of Embodiment of the Present Invention>

Figure 7:
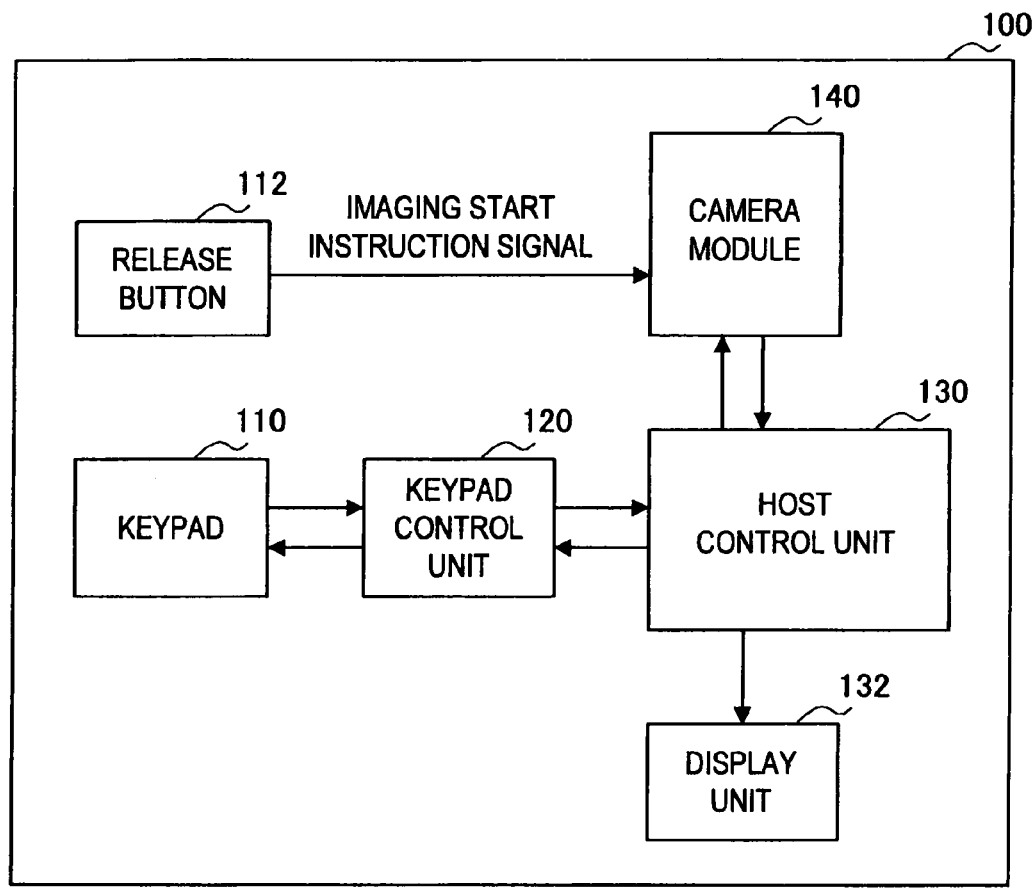
FIG. 7 is a block diagram showing a configuration of a mobile terminal device according to an embodiment.

FIG. 7 is a block diagram showing a configuration of a mobile terminal device 100 according to an embodiment of the present invention. Referring to FIG. 7, the mobile terminal device 100 includes a keypad 110, a release button 112, a keypad control unit 120, a host control unit 130, a display unit 132 and a camera module 140.

The keypad 110 and the keypad control unit 120 have equal functions to the keypad 10 and the keypad control unit 20 described earlier with reference to FIG. 3. Specifically, when any button of the keypad 110 is pressed by a user, the keypad control unit 120 determines which button of the keypad 110 is pressed by periodic monitoring of the key matrix and outputs an input signal associated with the kind of the pressed button to the host control unit 130.

The release button 112 is substantially the same button as the dedicated button 112 shown in FIG. 1. When pressed by a user, the release button 112 generates an imaging start instruction signal and outputs it to the camera module 140. The release button 112 may be a button that is physically the same as one of a plurality of buttons included in the keypad 110 or a button that is independent of the keypad 110.

The host control unit 130 is typically configured using a CPU and controls the functions of the mobile terminal device 100 as a whole. For example, the host control unit 130 controls the operation of the camera module 140 by using the I2C bus between the host control unit 130 and the camera module 140 or displays an captured image read from the camera module 140, a mute screen or the like on the display unit 132.

In addition to being controlled by the host control unit 130, the camera module 140 receives input of the imaging start instruction signal from the release button 112 and images external light.

Figure 8:
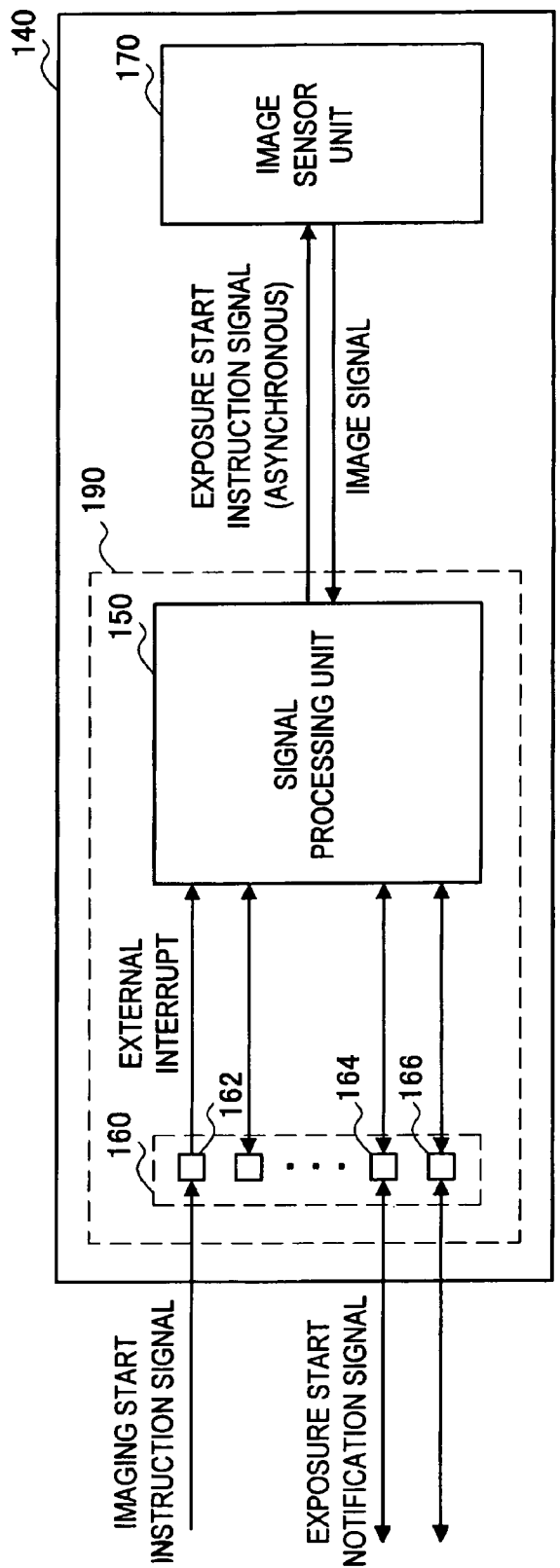
FIG. 8 is a block diagram showing a configuration of a camera module according to an embodiment.

FIG. 8 is a block diagram showing a specific configuration of the camera module 140. Referring to FIG. 8, the camera module 140 includes a signal processing unit 150, a terminal unit 160 and an image sensor unit 170.

The signal processing unit 150 is typically configured using a DSP (Digital Signal Processing). When the imaging start instruction signal is input to the terminal unit 160 from the release button 112 shown in FIG. 7, for example, the signal processing unit 150 detects input of the imaging start instruction signal by means of an external interrupt. Upon detecting input of the imaging start instruction signal, the signal processing unit 150 outputs an exposure start instruction signal to the image sensor unit 170 as an asynchronous signal without synchronization with vertical synchronization timing of the camera module 140. Further, the signal processing unit 150 forcibly switches the vertical synchronization timing of the camera module 140 in accordance with output of the exposure start instruction signal, for example.

The signal processing unit 150 may further output an exposure start notification signal for notifying start of exposure to the host control unit 130 via the terminal unit 160 upon detecting input of the imaging start instruction signal, for example. The host control unit 130 can thereby switch the screen to the mute screen during imaging processing by the camera module 140.

The terminal unit 160 includes terminals for inputting and outputting signals from the host control unit 130 to the camera module 140 as described earlier with reference to FIG. 2. In the example of FIG. 8, the terminal unit 160 includes I2C bus terminals 164 and 166. For example, the exposure start notification signal that notifies start of exposure from the signal processing unit 150 to the host control unit 130 can be output through the I2C bus terminals.

The terminal unit 160 further includes an external interrupt input terminal 162 for inputting the imaging start instruction signal from the release button 112. In the case where there is a distinction between the 1st release (half-press) and the 2nd release (full-press) for the pressed state of the release button 112, two external interrupt input terminals 162 may be placed to recognize each pressed state.

Figure 9:
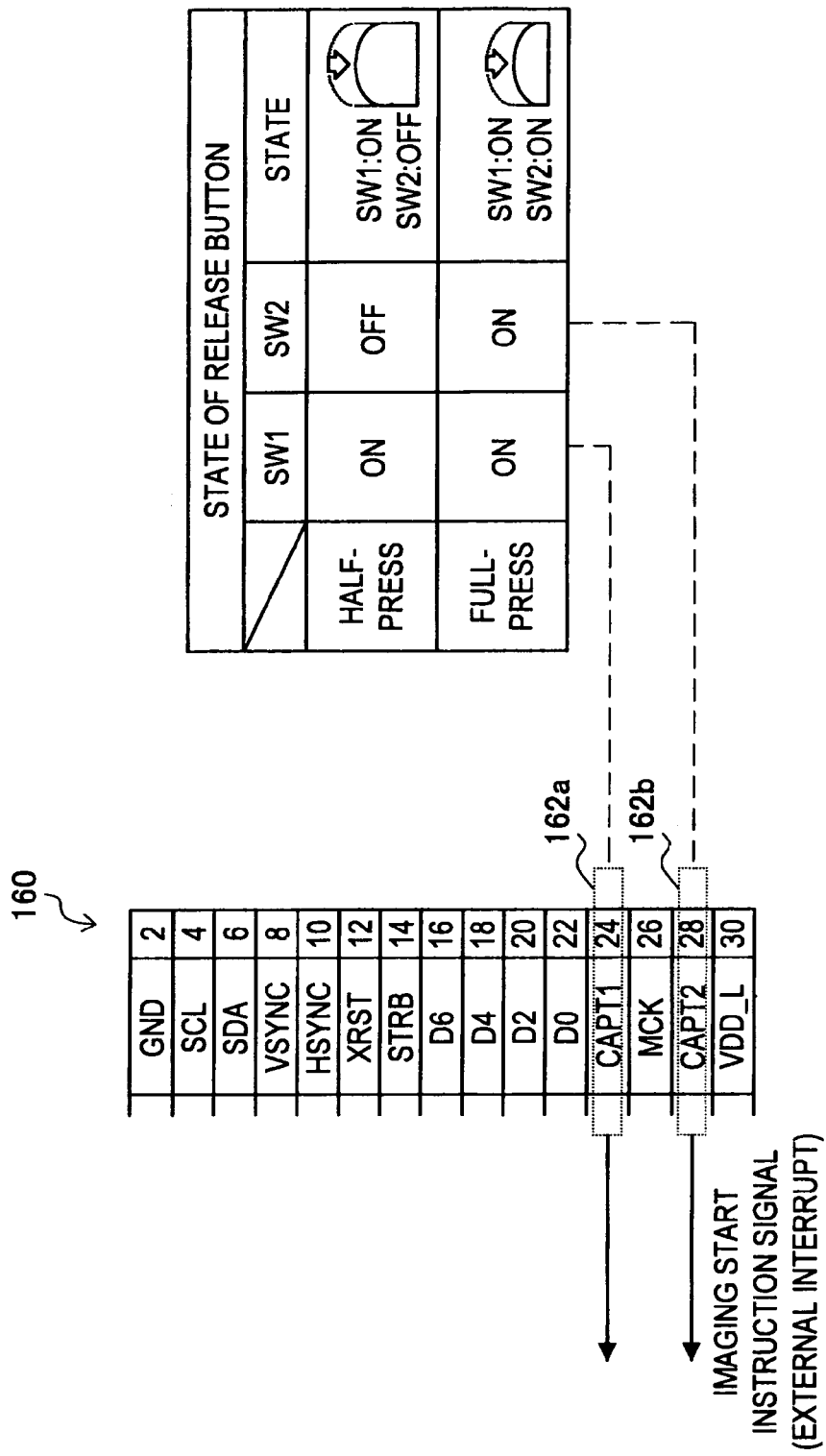
FIG. 9 is an explanatory view showing an example of allocation of a release input terminal according to an embodiment.

FIG. 9 is an explanatory view partially showing allocation of terminals in the case of placing two external interrupt input terminals 162 in the terminal unit 160 by way of illustration.

Referring to the left side of FIG. 9, the 24th terminal is allocated to an external interrupt input terminal 162a (CAPT1), and the 28th terminal is allocated to an external interrupt input terminal 162b (CAPT2), among the terminals included in the terminal unit 160.

The external interrupt input terminal 162a corresponds to a switch SW1 that detects the 1st release of the release button 112, and it turns on both in the half-pressed state and the full-pressed state. On the other hand, the external interrupt input terminal 162b corresponds to a switch SW2 that detects the 2nd release of the release button 112, and it turns off in the half-pressed state and turns on in the full-pressed state.

Figure 10:
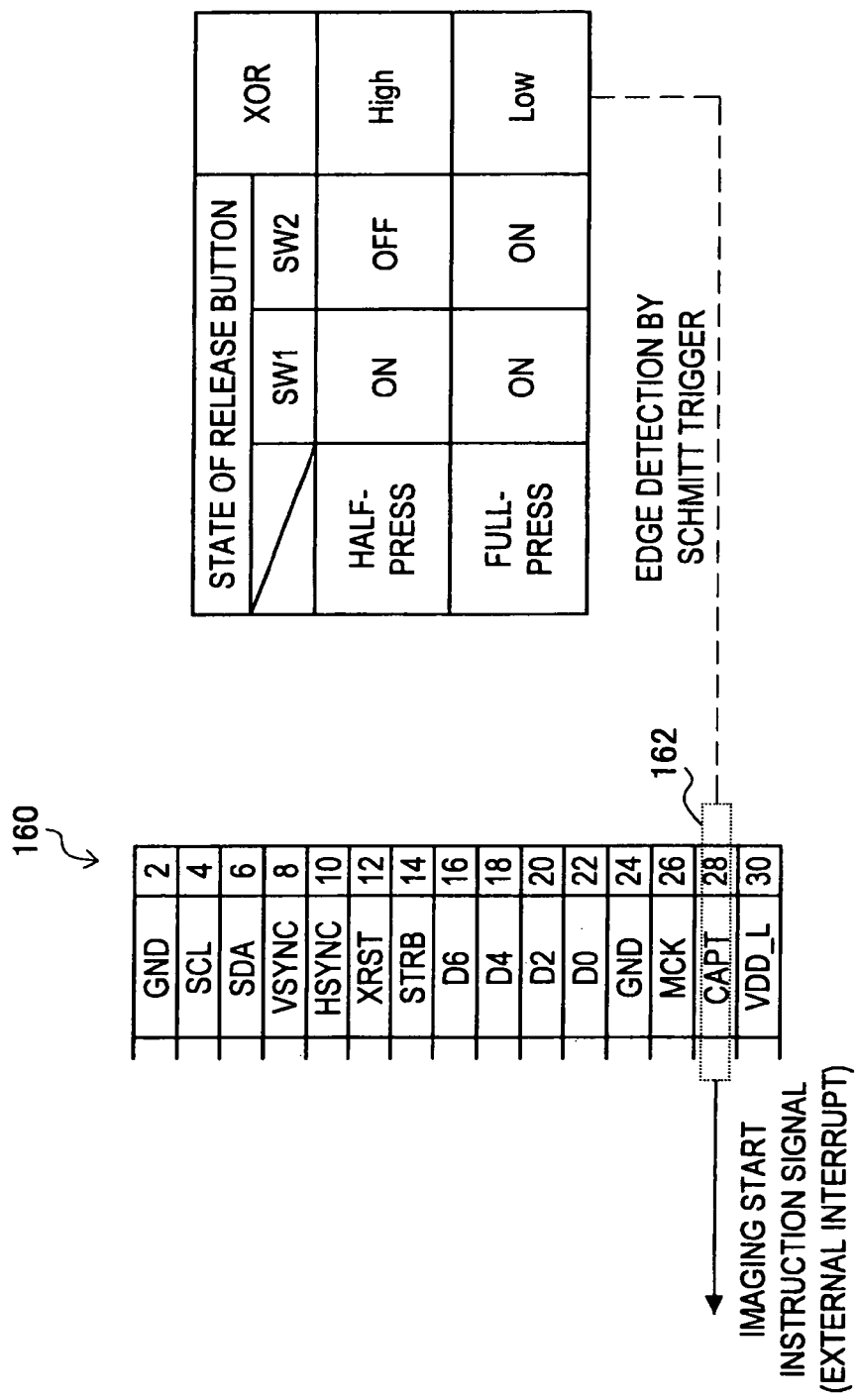
FIG. 10 is an explanatory view showing another example of allocation of a release input terminal according to an embodiment.

FIG. 10 is an explanatory view partially showing allocation of terminals in the case of placing one external interrupt input terminal 162 in the terminal unit 160 by way of illustration.

Referring to the left side of FIG. 10, the 28th terminal among the terminals included in the terminal unit 160 is allocated to an external interrupt input terminal 162 (CAPT). A signal corresponding to an exclusive OR between an output of the switch SW1 that detects the 1st release of the release button 112 and an output of the switch SW2 that detects the 2nd release of the release button 112 is input to the external interrupt input terminal 162. In this case, a rising edge at which the input signal changes from Low to High corresponds to the half-press of the release button 112, and a falling edge at which the input signal changes from High to Low corresponds to the full-press of the release button 112 (cf. on the right side of FIG. 10). In this case, it is preferred to eliminate malfunction due to chattering with use of a Schmitt trigger circuit.

An existing connector ground terminal (GND terminal), for example, may be used as the external interrupt input terminal 162 (162a and 162b). Alternatively, the external interrupt input terminal 162 may be newly provided.

Referring back to FIG. 8, the configuration of the camera module 140 is further described hereinbelow.

Upon input of the exposure start instruction signal from the signal processing unit 150, the image sensor unit 170 prepares for exposure and then images external light that reaches a light-receiving surface through the lens 172 (cf. FIG. 2) on the outside of the mobile terminal device 100 and generates an image signal. The image sensor unit 170 then outputs the generated image signal to the signal processing unit 150.

In the camera module 140 described in this specification, the signal processing unit 150 and the terminal unit 160 may constitute a signal processing device 190. In this case, the image sensor unit 170 is a separate image sensor module including the lens 172. Further, an image sensor interface (not shown) may be mounted on the signal processing unit 150, so that signals are input and output between the signal processing unit 150 and the image sensor unit 170 through the interface. This allows the signal processing device 190 to be treated as an independent device.

Figure 11:
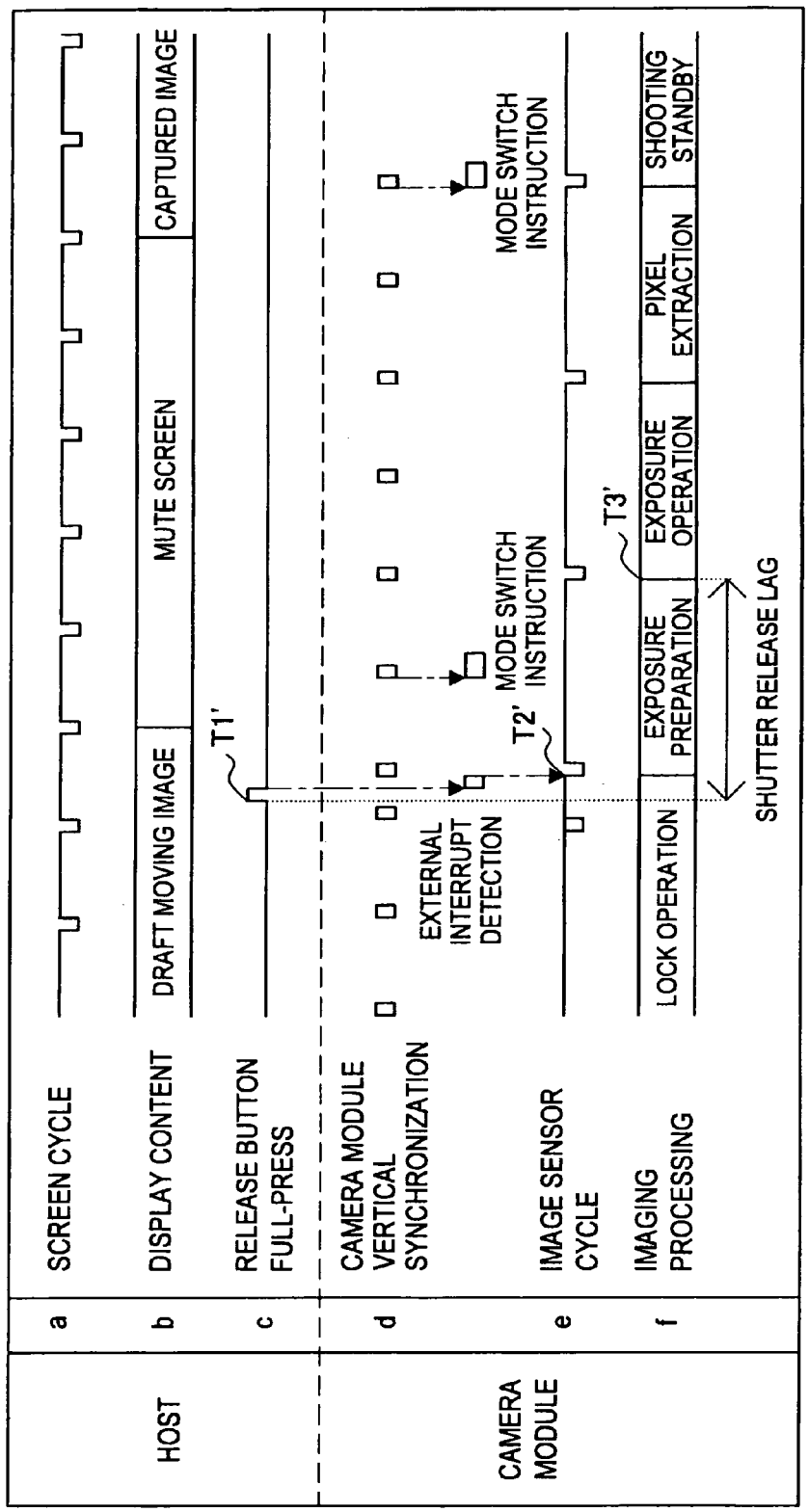
FIG. 11 is a timing chart showing a shutter release lag in a camera-equipped mobile terminal device according to an embodiment.

FIG. 11 is a timing chart to describe a shutter release lag in the mobile terminal device 100 according to the embodiment described above.

At the left end of the timing chart of FIG. 11, the state of the camera module 140 is in "LOCK operation" as a result that a user half-presses the release button 112. In this state, the camera module 140 executes exposure control, autofocus, auto white balance or the like. At this time, the screen of the display unit 132 is in the state of "draft moving image" in which a rough image captured by the image sensor 170 is displayed as it is.

After that, when a user full-presses the release button 112 at timing T1', an imaging start instruction signal is input to the external interrupt input terminal 162 from the release button 112 without through the host control unit 130. The imaging start instruction signal is detected as an external interrupt by the signal processing unit 150 of the camera module 140.

Next, at timing T2', the signal processing unit 150 outputs an exposure start instruction signal as an asynchronous signal to the image sensor unit 170 without waiting for vertical synchronization of the camera module 140. Further, the signal processing unit 150 forcibly switches the vertical synchronization of the camera module 140 and the sensor cycle of the image sensor unit 170 in accordance with output of the exposure start instruction signal, for example.

After that, the image sensor unit 170 that has received the exposure start instruction signal performs exposure preparation, and exposure is started at timing T3'.

The signal processing unit 150 may switch the screen displayed on the display unit 132 to the mute screen by outputting an event to the host control unit 130, for example, before instructing the image sensor unit 170 to start exposure at T2'. Alternatively, the host control unit 130 may receive the imaging start instruction signal from the release button 112 in parallel, and the host control unit 130 may control switching to the mute screen.

In FIG. 11, the shutter release lag after a user full-presses the release button 112 until the camera module 140 starts exposure corresponds to the period from T1' to T3'. As obvious from a comparison between FIG. 6 and FIG. 11, the shutter release lag in this embodiment is reduced in the period from T1' to T2' (from T1 to T2) compared to the shutter release lag in FIG. 6. Such reduction of the time lag is for the following reasons.

Firstly, in this embodiment, the imaging start instruction signal generated by the release button 112 that is pressed by a user is directly input to the camera module 140 without through the keypad control unit 120 or the host control unit 130. A time lag for periodic monitoring of the keypad 110 thereby does not occur.

Further, the state of the release button 112 directly corresponds to output of the imaging start instruction signal as shown in FIG. 9, for example, and delay for removal of chattering in the release button 112 does not occur when edge detection is not performed.

Furthermore, because the imaging start instruction signal does not pass through the host control unit 130, a time lag due to interpretation or translation of a signal when using a common signal transmission channel such as the I2C bus, for example, does not occur.

In addition, in this embodiment, the imaging start instruction signal that is input to the external interrupt input terminal 162 of the camera module 140 (or the signal processing device 190) is detected as an external interrupt by the signal processing unit 150. Then, the signal processing unit 150 outputs the exposure start instruction signal without waiting for the arrival of the next sensor cycle of the image sensor unit 170. A time lag during a wait for the arrival of a cyclic signal thereby does not occur inside the camera module 140 (or the signal processing device 190).

As described above, with use of the mobile terminal device 100 according to the embodiment, a time lag between pressing of a release button and start of exposure is reduced, and therefore a possibility that a user misses a photo opportunity decreases, for example. As an example, a time lag between T1 and T2 in FIG. 6 is about 50 ms in a mobile terminal device according to related art. On the other hand, a time lag between T1' and T2' in FIG. 11 is about 1 ms in the mobile terminal device 100 according to the present embodiment.

Figure 12:
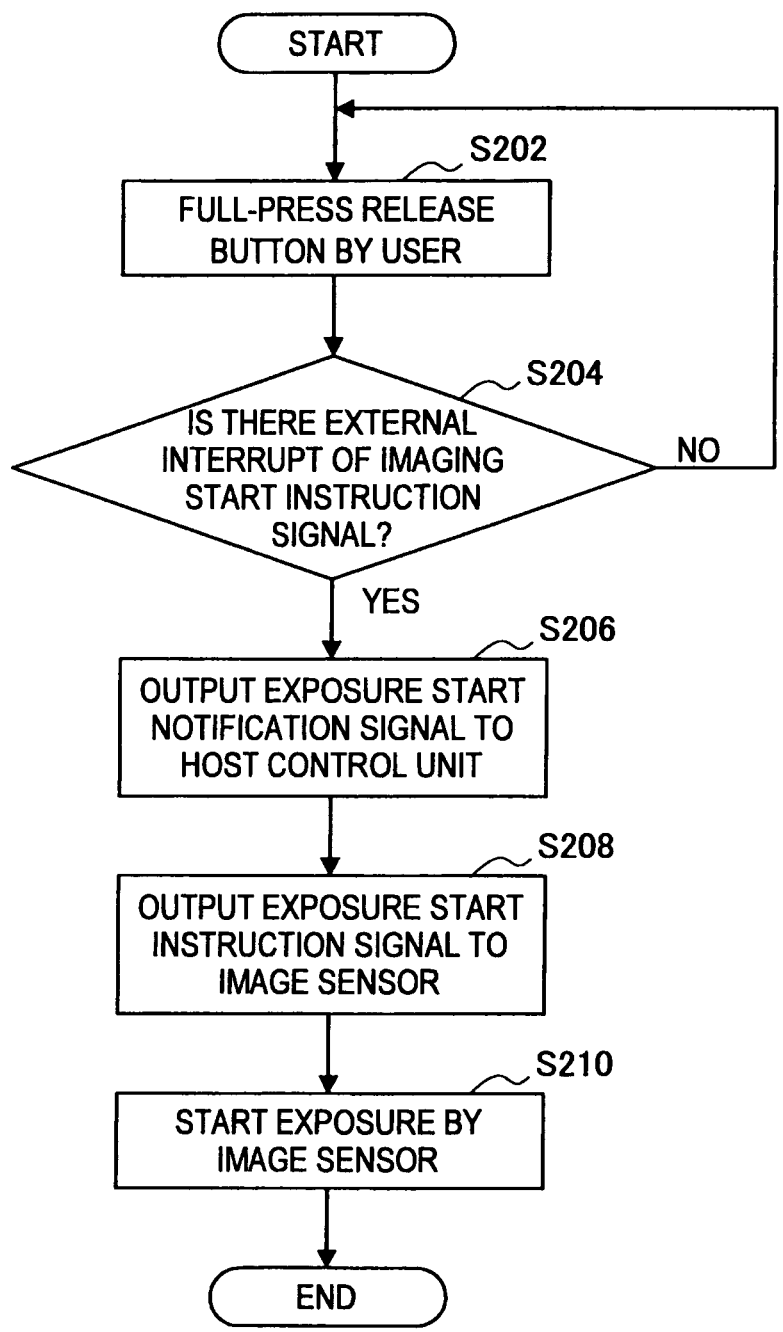
FIG. 12 is a flowchart showing a flow of imaging processing according to an embodiment.

FIG. 12 is a flowchart showing an example of a flow of imaging processing according to an embodiment.

Referring to FIG. 12, a user first full-presses the release button 112 (S202). The imaging start instruction signal is thereby input to the external interrupt input terminal 162 of the camera module 140 (or the signal processing device 190).

On the other hand, the signal processing unit 150 of the camera module 140 waits for input of the imaging start instruction signal by an external interrupt (S204). When the signal processing unit 150 detects the imaging start instruction signal, the signal processing unit 150 first outputs the exposure start notification signal to the host control unit 130, for example (S206). Then, the signal processing unit 150 outputs the exposure start instruction signal as an asynchronous signal to the image sensor unit 170 without synchronization with vertical synchronization timing of the camera module 140 (S208).

After that, the image sensor unit 170 prepares for exposure and then starts exposure (S210).

<4. Summary>

The camera-equipped mobile terminal device 100 according to the embodiment of the present invention, the camera module 140 incorporated in the device, and the signal processing device 190 used in the module are described above with reference to FIGS. 1 to 12.

In the camera-equipped mobile terminal device 100 according to the embodiment, a time lag due to periodic monitoring of the keypad 110 or interpretation or translation of a signal when passing through the I2C bus or the like does not occur. Further, in the internal of the camera module 140 (or the signal processing device 190) according to the present embodiment, a time lag during a wait for the arrival of a cyclic signal when giving instruction for exposure start does not occur. It is thereby possible to reduce a time lag such as the shooting time lag and the shutter release lag between a release operation and exposure start without degrading the image quality.

It is feasible to use an existing device as the mobile terminal device (thus, the imaging start instruction signal passes through the host control unit) and use the camera module 140 according to the embodiment for the internal camera module. Further, the signal processing device 190 that includes the signal processing unit 150 and the terminal unit 160, out of the camera module 140, may be provided. In these cases also, reduction of a time lag inside the camera module is achieved, and therefore a time lag between a user's release operation and exposure start is reduced as a whole.

It should be understood by those skilled in the art that various modifications, combinations, sub-combinations and alterations may occur depending on design requirements and other factors insofar as they are within the scope of the appended claims or the equivalents thereof.

What is claimed is:

1. A camera module connectable to a host control unit and a release button of a mobile device, said camera module comprising:
    an input terminal to receive input of an imaging start instruction signal from the release button;
    a signal processing unit to output an exposure start instruction signal when the imaging start instruction signal is input to the input terminal; and
    an image sensor unit to image external light and generate an image signal when the exposure start instruction signal is input,
    in which the signal processing unit outputs the exposure start instruction signal to the image sensor unit as an asynchronous signal without waiting for synchronization with a vertical synchronization signal of the camera module, in which the vertical synchronization signal has a plurality of normally occurring pulses associated therewith, such that the exposure start instruction signal is outputted to the image sensor unit before a pulse of the vertical synchronization signal which would have normally occurred next after generation or receipt by the input terminal of the imaging start instruction signal,
    in which operation of the camera module is controlled by the host control unit,
    in which the imaging start instruction signal is directly input to the camera module from the release button without passing through the host control unit, and
    in which the mobile device includes a display which is connectable to the host control unit which controls the display to cause images or a mute screen to be displayed on the display such that the camera module is separate from and not connectable directly to the display.

2. The camera module according to claim 1, wherein the signal processing unit detects input of the imaging start instruction signal to the input terminal as an external interrupt.

3. The camera module according to claim 1, wherein the signal processing unit forcibly switches vertical synchronization timing of its own device from that which is normally occurring in accordance with output of the exposure start instruction signal.

4. The camera module according to claim 1, wherein the signal processing unit further outputs an exposure start notification signal for notifying start of exposure to the host control unit when the imaging start instruction signal is input to the input terminal.

5. The camera module according to claim 1, in which a time between the imaging start instruction signal and the output of the exposure start instruction signal is approximately 1 ms (milli-second).

6. A camera-equipped mobile terminal device comprising:
    a release button to generate an imaging start instruction signal when pressed by a user;
    a camera module having (i) an input terminal to receive input of the imaging start instruction signal generated by the release button, (ii) a signal processing unit to output an exposure start instruction signal when the imaging start instruction signal is input to the input terminal, and (iii) an image sensor unit to image external light and generate an image signal when the exposure start instruction signal is input; and
    a host control unit to control operation of the camera module; and
    a display connectable to the host control unit which controls the display to cause images or a mute screen to be displayed on the display,
    in which the signal processing unit outputs the exposure start instruction signal to the image sensor unit as an asynchronous signal without waiting for synchronization with a vertical synchronization signal of the camera-equipped mobile terminal device, in which the vertical synchronization signal has a plurality of normally occurring pulses associated therewith, such that the exposure start instruction signal is outputted to the image sensor unit before a pulse of the vertical synchronization signal which would have normally occurred next after generation due to the release button or receipt by the input terminal of the imaging start instruction signal,
    in which the imaging start instruction signal is directly input to the camera module from the release button without passing through the host control unit, and
    in which the camera module is separate from and not connectable directly to the display.

7. The camera-equipped mobile terminal device according to claim 6, in which a time between the imaging start instruction signal and the output of the exposure start instruction signal is approximately 1 ms (milli-second).

8. An imaging method for use with a mobile device, said method comprising the steps of:
    transmitting an imaging start instruction signal from a release button pressed by a user to an input terminal of a camera module without passing through a host control unit, such that the imaging start instruction signal is directly input to the camera module from the release button without passing through the host control unit;
    detecting the imaging start instruction signal input to the input terminal by a signal processing unit of the camera module;
    transmitting an exposure start instruction signal from the signal processing unit to an image sensor; and
    imaging external light and generating an image signal by the image sensor where the exposure start instruction signal is input,
    wherein the signal processing unit outputs the exposure start instruction signal to the image sensor as an asynchronous signal without waiting for synchronization with a vertical synchronization signal of the camera module, in which the vertical synchronization signal has a plurality of normally occurring pulses associated therewith, such that the exposure start instruction signal is outputted to the image sensor before a pulse of the vertical synchronization signal which would have normally occurred next after generation due to the release button or receipt by the input terminal of the imaging start instruction signal,
    in which operation of the camera module is controlled by the host control unit, and
    in which the mobile device includes the camera module, the host control unit, and a display in which the display is connected to the host control unit which controls the display to cause images or a mute screen to be displayed on the display such that the camera module is separate from and not connected directly to the display.

* * * * *